United States Patent
Gupta et al.

(10) Patent No.: US 12,243,121 B2
(45) Date of Patent: Mar. 4, 2025

(54) GENERATING AND PROPAGATING PERSONAL MASKING EDITS

(71) Applicant: Adobe Inc., San Jose, CA (US)

(72) Inventors: Subham Gupta, Roorkee (IN); Arnab Sil, Hooghly (IN); Anuradha, Bengaluru (IN)

(73) Assignee: Adobe Inc., San Jose, CA (US)

( * ) Notice: Subject to any disclaimer, the term of this patent is extended or adjusted under 35 U.S.C. 154(b) by 203 days.

(21) Appl. No.: 17/890,461

(22) Filed: Aug. 18, 2022

(65) Prior Publication Data

US 2024/0062431 A1 Feb. 22, 2024

(51) Int. Cl.
*G06T 11/00* (2006.01)
*G06V 40/16* (2022.01)

(52) U.S. Cl.
CPC .......... *G06T 11/00* (2013.01); *G06V 40/166* (2022.01); *G06V 40/171* (2022.01); *G06V 40/172* (2022.01); *G06T 2200/24* (2013.01); *G06T 2207/20081* (2013.01); *G06T 2207/30201* (2013.01)

(58) Field of Classification Search
None
See application file for complete search history.

(56) References Cited

U.S. PATENT DOCUMENTS

| 9,558,428 B1* | 1/2017 | Green | G06V 10/945 |
| 2008/0100612 A1* | 5/2008 | Dastmalchi | A61B 3/102 345/418 |
| 2011/0317896 A1* | 12/2011 | Huber | G06T 7/337 378/65 |
| 2014/0176750 A1* | 6/2014 | Pajak | H04N 23/632 348/222.1 |
| 2014/0241592 A1* | 8/2014 | Yang | G06T 5/60 382/118 |
| 2015/0371422 A1* | 12/2015 | Kokemohr | G06T 11/60 382/311 |
| 2016/0019426 A1* | 1/2016 | Tusch | G06V 20/47 386/286 |
| 2016/0027151 A1* | 1/2016 | Edwin | G06T 5/77 382/195 |
| 2018/0075665 A1* | 3/2018 | Konoplev | G06T 7/251 |
| 2019/0164322 A1* | 5/2019 | Kong | G06T 7/11 |
| 2020/0349464 A1* | 11/2020 | Lin | G06N 3/084 |
| 2021/0150677 A1* | 5/2021 | Sytnik | G06T 5/70 |
| 2022/0148247 A1* | 5/2022 | Bashkirov | G06T 13/40 |
| 2024/0196082 A1* | 6/2024 | Wang | H04N 23/62 |

* cited by examiner

*Primary Examiner* — Anh-Tuan V Nguyen
(74) *Attorney, Agent, or Firm* — FIG. 1 Patents

(57) ABSTRACT

In implementations of systems for generating and propagating personal masking edits, a computing device implements a mask system to detect a face of a person depicted in a digital image displayed in a user interface of an application for editing digital content. The mask system determines an identifier for the person based on an identifier for the face. Edit data is received describing properties of an editing operation and a type of mask used to modify a particular portion of the person depicted in the digital image. The mask system edits an additional digital image identified based on the identifier of the person using the type of mask and the properties of the editing operation to modify the particular portion of the person as depicted in the additional digital image.

19 Claims, 11 Drawing Sheets
(7 of 11 Drawing Sheet(s) Filed in Color)

Fig. 5

GENERATING AND PROPAGATING PERSONAL MASKING EDITS

BACKGROUND

Applications for editing digital images such as digital photographs are usable to edit visual features of objects or portions of objects depicted in the digital images, for example, to improve an overall visual appearance of the digital images. For instance, a user interacts with an input device (e.g., a mouse, a stylus, a touchscreen, etc.) relative to a user interface of an application for editing digital images to edit digital photographs captured at a wedding by modifying a color of clothing worn by a particular person depicted in the digital photographs such that the modified color is consistent with colors of clothing worn by other people at the wedding. Using conventional systems, the user interacts with the input device relative to the user interface to modify the color of the clothing worn by the particular person in each of the digital photographs that depicts the particular person. Individually editing each of the digital photographs in this manner is tedious and time consuming for the user which is a limitation of the conventional systems.

SUMMARY

Techniques and systems for generating and propagating personal masking edits are described. In an example, a computing device implements a mask system to detect a face of a person depicted in a digital image displayed in a user interface of an application for editing digital content. The mask system determines an identifier of the person based on an identifier of the face.

For example, the mask system receives edit data describing properties of an editing operation and a type of mask used to modify a particular portion of the person depicted in the digital image. In one example, the mask is a machine learning based mask. The mask system edits an additional digital image identified based on the identifier of the person using the type of the mask and the properties of the editing operation to modify the particular portion of the person as depicted in the additional digital image.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures are indicative of one or more entities and thus reference is made interchangeably to single or plural forms of the entities in the discussion.

FIGS. 3A, 3B, 3C, and 3D illustrate an example of generating and propagating personal masking edits.

DETAILED DESCRIPTION

Overview

Figure 1:
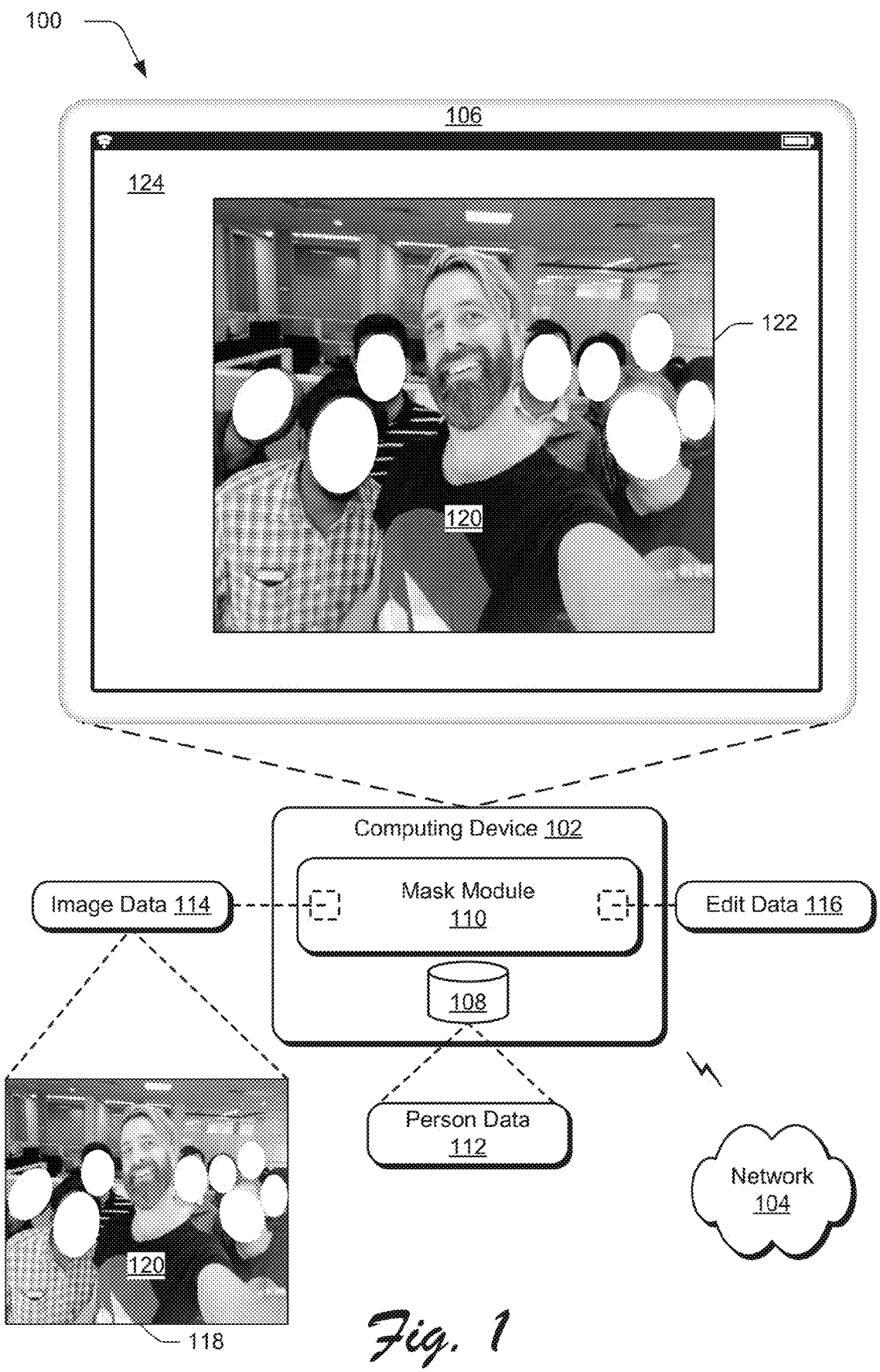
FIG. 1 is an illustration of an environment in an example implementation that is operable to employ digital systems and techniques for generating and propagating personal masking edits as described herein.

In order to edit a particular portion of a person that is depicted in multiple digital images using conventional systems, a user interacts with an input device (e.g., a touchscreen, a microphone, a mouse, a stylus, etc.) relative to a user interface of an application for editing digital content to modify the particular portion of the person for each of the multiple digital images that depict the person. Individually editing each of the multiple digital images in this manner is time consuming and tedious for the user which is a shortcoming of the conventional systems. In order to overcome the limitations of conventional systems, techniques and systems for generating and propagating personal masking edits are described.

In one example, a computing device implements a mask system to detect a face of a person depicted in a digital image displayed in a user interface of an application for editing digital content. For instance, the application for editing digital content includes or has access to a first machine learning model trained on training data to detect faces of people depicted in digital images and the mask system leverages the trained first machine learning model to detect the face of the person depicted in the digital image. A segment mask is generated for the person using a second machine learning model included in or available to the application for editing digital content that is trained on training data to generate segment masks for person objects depicted in digital images. For example, the segment mask is usable to select or segment a person object depicted in the digital image that corresponds to the person.

In an example, the mask system associates the face of the person with the person object by computing an overlap score based on a number of pixels of the face of the person that overlap with the segment mask and a total number of the pixels of the face of the person. In this manner, the mask system determines that the face of the person is associated with the person object and not associated with an additional person object depicted in the digital image. For instance, the mask system extracts the person from the digital image as a separate digital image using the segment mask for the person.

For example, the mask system uses the separate digital image to determine types of masks of the application for editing digital content that are usable to select and segment all of the person (e.g., all of the person object) or portions of the person depicted in the digital image. Examples of masks usable to select and segment portions of the person include facial masks, facial skin masks, beard masks, hair masks, clothes masks, teeth masks, eye masks, and so forth. For instance, the mask system displays indications of the determined types of masks in the user interface of the application for editing digital content.

The user interacts with the input device relative to the user interface of the application for editing digital content to interact with a displayed indication of a mask, e.g., a hair mask. The interaction with the displayed indication of the hair mask causes selection or segmentation of the person's hair as depicted in the digital image. For example, after selecting the person's hair using the hair mask, the user further interacts with the input device relative to the user interface to specify properties of an editing operation that edits the digital image by modifying a color of the person's hair from blonde to green.

The mask system receives edit data describing the hair mask and the properties of the editing operation, and the mask system processes the edit data to generate a personal masking edit for the person depicted in the digital image. For example, the personal masking edit is usable to edit additional digital image depicting the person by coloring the person's hair green in the additional digital images. In one example, the mask system updates a database of person data that describes associations between identifiers of persons depicted in digital images of a set of digital images and personal masking edits for the persons depicted in the digital images. In this example, the person data also describes associations between the identifiers of the persons and identifiers of faces of the persons depicted in the digital images. Continuing this example, the mask system updates the database of the person data by associating an identifier of the person depicted in the digital image with the personal masking edit for the person that is usable to color the person's hair green in the additional digital images.

For example, the mask system identifies the additional digital images of the set of digital images as depicting the person using the identifier of the person. In one example, the mask system automatically edits the additional digital images identified as depicting the person using the personal masking edit for the person by selecting the person's hair in the additional digital images using the hair mask and coloring the person's hair green in the additional digital images using the properties of the editing operation. In another example, the mask system displays indications of the additional digital images in the user interface of the application for editing digital content. In this example, the user interacts with the input device relative to the user interface to specify particular digital images of the additional digital images.

For instance, the mask system receives the edit data as describing the particular digital images and the mask system process the edit data to edit the particular digital images using the personal masking edit. In an example, the mask system selects the hair of the person as depicted in the particular digital images using the hair mask and colors the person's hair green using the properties of the editing operation. Consider an example in which the person data describes additional personal masking edits associated with the identifier of the person. In this example, after the mask system identifies the additional digital images of the set of digital images as depicting the person using the identifier of the person, the mask system displays indications of the additional personal masking edits in the user interface of the application for editing digital content.

Continuing the previous example, the user interacts with the input device relative to the user interface to specify that a particular personal masking edit is to be applied (e.g., by interacting with an indication of the particular personal masking edit). The user continues to interact with the input device relative to the user interface to specify that a particular digital image of the of the set of digital images that depict the person is to be edited using the particular personal masking edit (e.g., by interacting with an indication of the particular digital image). For example, the mask system receives and processes the edit data as describing the particular personal masking edit and the particular digital image, and the mask system edits the particular digital image using a type of machine learning based mask and properties of an editing operation described by the particular personal masking edit.

By leveraging the database of person data that describes the associations between the identifier of the person and the personal mask edits for the person, the described systems are capable of simultaneously modifying all or a portion of the person as depicted in multiple digital images. This is not possible using conventional systems that are limited to editing portions of digital images manually one digital image at a time. The described systems are also capable of identifying objects other than person objects depicted in digital images and automatically editing the digital images locally by applying editing presets to the identified objects which is also not possible using the conventional systems.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and a mask module 110.

The storage device 108 is illustrated to include person data 112 that describes associations between identifiers of persons depicted in digital images and corresponding identifiers of faces of the persons depicted in the digital images. In an example, the person data 112 also describes personal or person-specific masking edits corresponding to each of the identifiers of the persons. For example, the personal masking edits describe properties of editing operations performed on digital images depicting a particular person that change a visual appearance of at least a portion of the particular person as depicted in the digital images. In this example, the personal masking edits are represented as extensible metadata platform documents; however, in other examples, the personal masking edits are represented in other formats and/or using different types of documents.

For instance, each unique person identified and described by the person data 112 has a corresponding identifier that is also unique, and each identifier of a person is associated with every identifier of the person's face described by the person data 112. Consider an example in which the particular person of the previous example is depicted in three different digital images. In this example, the person data 112 describes a unique identifier for the particular person (e.g., Person-ID1) which is associated with an identifier of the particular person's face as depicted in each of the three digital images (e.g., Face-ID1, Face-ID2, and Face-ID3).

In an example, personal masking edits for the particular person described by the person data 112 are also associated with the identifier for the particular person (e.g., Person-ID1). In this example, two of the three digital images have been edited to modify a visual appearance of a portion of the particular person, and the person data 112 describes the identifier of the particular person (e.g., Person-ID1) as being associated with identifiers of personal masking edits (e.g., Edit-ID1 and Edit-ID2) that describe properties of editing operations performed to modify the visual appearance of the portion of the particular person depicted in the two digital images. Accordingly, the identifier for the particular person (e.g., Person-ID1) is usable to determine a set of digital images that depict the particular person's face and also to determine properties of editing operations performed to modify a visual appearance of a portion of the particular person.

The mask module 110 is illustrated as having, receiving, and/or transmitting image data 114 and the mask module 110 is also illustrated as having, receiving, and/or transmitting edit data 116. For instance, the image data 114 describes a digital image 118 which depicts nine people that are posing for a group picture. A person 120 is included among the nine people posing for the group picture. For example, the person data 112 describes an identifier for the person 120 as well as an identifier for each of the eight other people depicted in the digital image 118. In this example, the person data 112 also describes an identifier for a face of the person 120 and an identifier for each of faces of the other eight people depicted in the digital image 118. Similarly, the person data 112 describes identifiers of personal masking edits that describe properties of editing operations performed on additional digital images depicting the person 120 which modify a visual appearance of a portion of the person 120 as depicted in the additional digital images.

Consider an example in which the mask module 110 leverages the person data 112 and the edit data 116 to modify the digital image 118 which depicts the person 120 with hair colored pink and a naturally colored beard before the digital image 118 is modified. In this example, the edit data 116 describes properties of an editing operation and a type of mask usable to modify a particular portion of the person 120 depicted in the digital image 118. For instance, a user interacts with an input device (e.g., a mouse, a stylus, a touchscreen, a microphone, a keyboard, etc.) relative to a user interface of an application for editing digital content which is displaying the digital image 118 to generate the edit data 116.

In one example, the user interacts with the input device relative to the user interface of the application for editing digital content to implement a machine learning based mask to select or segment the particular portion of the person 120 depicted in the digital image 118. Continuing this example, the application for editing digital content selects or segments the particular portion of the person 120 using the machine learning based mask which is part of functionality available to the application for editing digital content via a machine learning model. As used herein, the term "machine learning model" refers to a computer representation that is tunable (e.g., trainable) based on inputs to approximate unknown functions. By way of example, the term "machine learning model" includes a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, reinforcement learning, and/or transfer learning. For example, the machine learning model is capable of including, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. By way of example, a machine learning model makes high-level abstractions in data by generating data-driven predictions or decisions from the known input data.

Consider an example in which the particular portion of the person 120 described by the edit data 116 is the person's 120 hair and the properties of the editing operation modify the color of the person's 120 hair from pink as depicted in the digital image 118 to green as depicted in a modified digital image 122 which is displayed in a user interface 124 of the display device 106. For example, the mask module 110 generates a personal masking edit for the person 120 based on the edit data 116 that associates the person 120 with the editing operation that colored the person's 120 hair green. In this example, the mask module 110 generates additional person data 112 as describing the personal masking edit for the person 120.

For instance, the personal masking edit for the person 120 is usable (e.g., by the mask module 110) to propagate the editing operation to additional digital images that depict the person 120 such that the additional digital images depict the person's 120 hair colored green as in the modified digital image 122. In one example, the mask module 110 identifies the additional images as depicting the person based on the identifier for the person 120 described by the person data 112. In this example, the mask module 110 segments or selects the person's 120 hair in the additional digital images using a hair machine learning based mask or a hair mask in order to color the person's 120 hair green in the additional digital images.

Consider another example in which the mask module 110 leverages the person data 112 to edit the digital image 118. In this example, the mask module 110 uses the identifier for the person 120 to identify personal masking edits for the person 120 described by the person data 112. In one example, the mask module 110 displays indications of identified personal masking edits for the person 120 in the user interface (e.g., the user interface 124) of the application for editing digital content. For example, the mask module 110 displays an indication of a personal masking edit for the person 120 that was generated by coloring the person's 120 beard pink in another digital image.

Continuing the previous example, the user interacts with the input device relative to the user interface (e.g., the user interface 124) of the application for editing digital content to generate the edit data 116 as describing a selection of the indication of the personal masking edit for the person 120. The mask module 110 receives and processes the edit data 116 to color the person's 120 beard pink which is illustrated in the modified digital image 122. In a first example, the mask module 110 colors the person's 120 beard pink automatically and without user intervention in response to receiving and processing the edit data 116.

In a second example, the mask module 110 selects or segments the person's 120 beard using a beard machine learning based mask or a beard mask in response to receiving and processing the edit data 116. In this second example, the user interacts with the input device relative to the user interface 124 to specify the color pink for coloring the person's 120 beard. In a third example, the mask module 110 suggests the color pink for coloring the person's 120 beard, e.g., by coloring the indication pink, based on the hair color of the person 120 as depicted in the digital image 118. In this third example, the user interacts with the input device relative to the user interface 124 of the application for editing digital content to accept the suggestion and causes the person's 120 beard to be colored pink. For instance, the mask module 110 colors the person's 120 beard pink in response to receiving the edit data 116 describing the accepted suggestion.

Although the mask module 110 is described as generating and propagating personal masking edits, it is to be appreciated that in some examples the mask module 110 is also capable of generating and propagating presets for editing the digital image 118. For example, the presets are also represented as extensible metadata platform documents and the presets are usable to edit the digital image 118 globally and/or locally. For instance, the mask module 110 is capable of detecting and classifying objects depicted in the digital image 118 in addition to detecting faces of people depicted in the digital image 118.

In one example, the mask module 110 leverages label vectors of detected objects and compares the label vectors to preset labels to identify relevant presets for modifying the detected objects. In this example, the mask module 110 selects or segments a detected object depicted in the digital image 118 using a type of machine learning based mask generated by a machine learning model of the application for editing digital content. For example, the mask module 110 selects a subject object using a subject machine learning based mask, a sky object using a sky machine learning based mask, and so forth. The mask module 110 then applies a relevant preset to the selected or segmented object to edit the object locally within the digital image 118. The mask module 110 is also capable of suggesting and applying the relevant preset to objects similar to the selected or segmented object identified in additional digital images.

Figure 2:
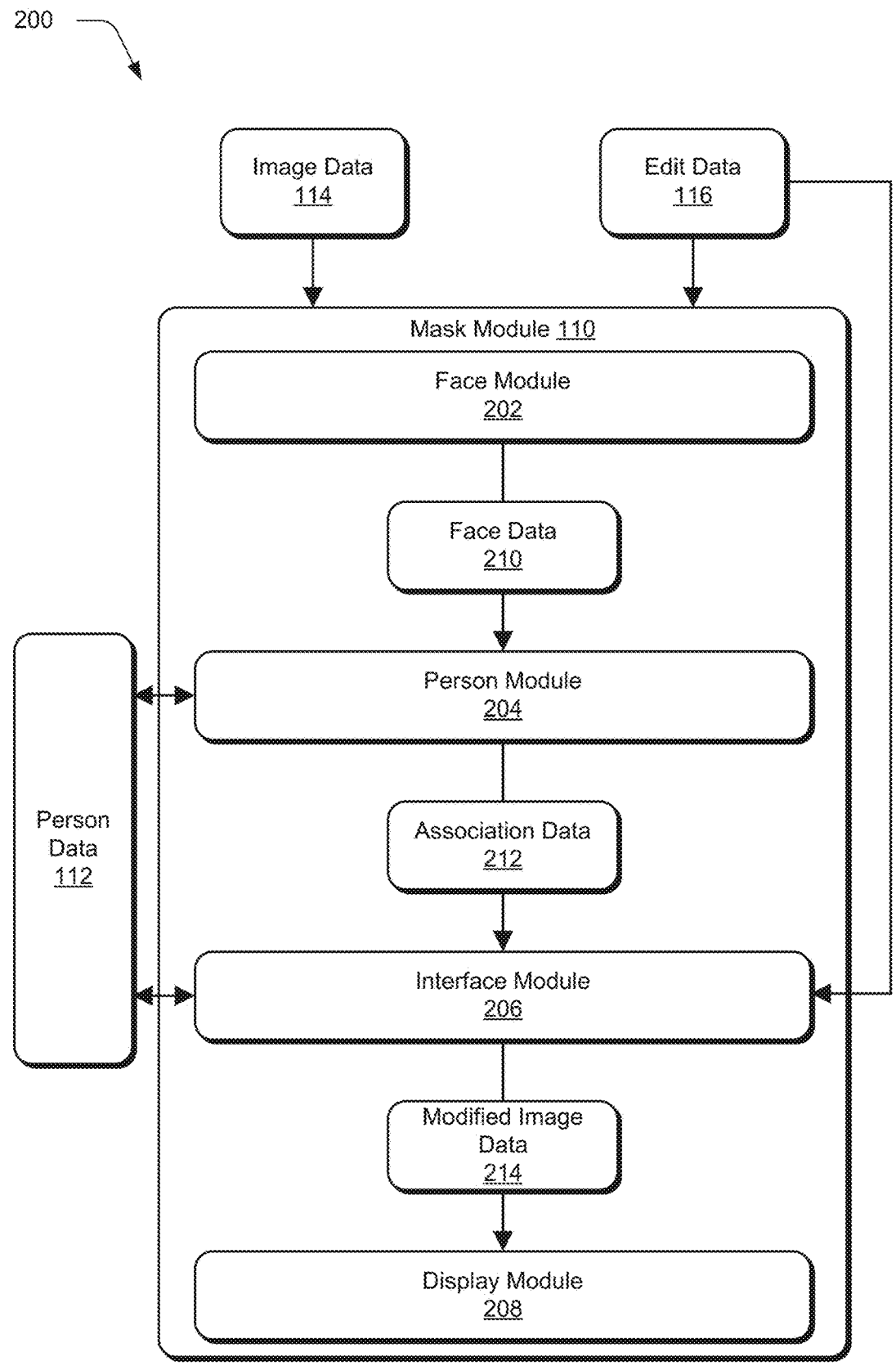
FIG. 2 depicts a system in an example implementation showing operation of a mask module for generating and propagating personal masking edits.

FIG. 2 depicts a system 200 in an example implementation showing operation of a mask module 110. The mask module 110 is illustrated to include a face module 202, a person module 204, an interface module 206, and a display module 208. In an example, the mask module 110 receives the image data 114 and the edit data 116 as inputs. For example, the face module 202 receives and processes the image data 114 to generate face data 210.

Figure 3A:
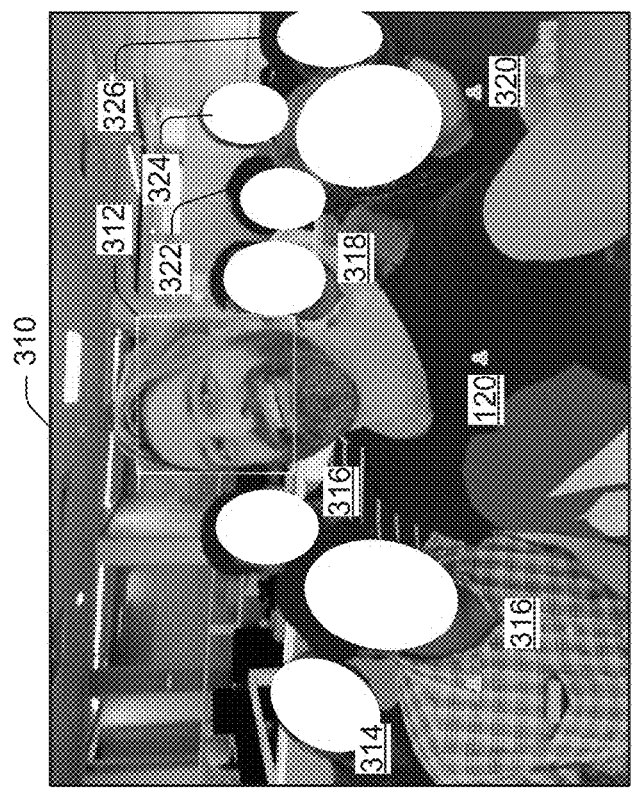
Figure 3A:
Figure 5B:
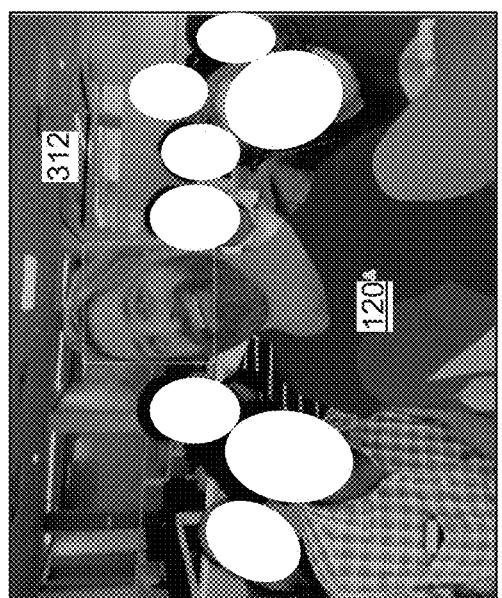
FIG. 5 illustrates a representation of example extensible metadata platform documents.
Figure 5B:
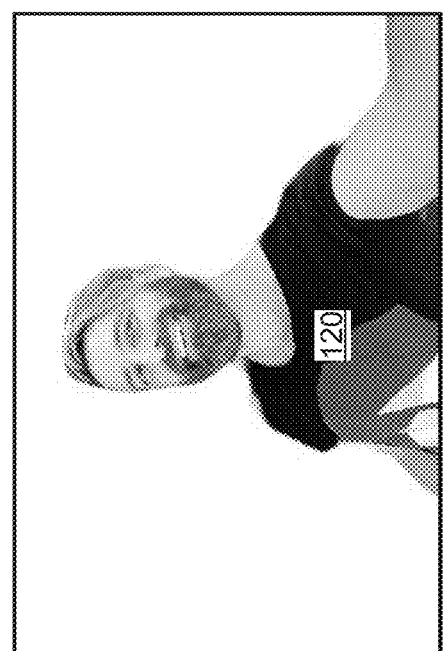
Figure 5B:
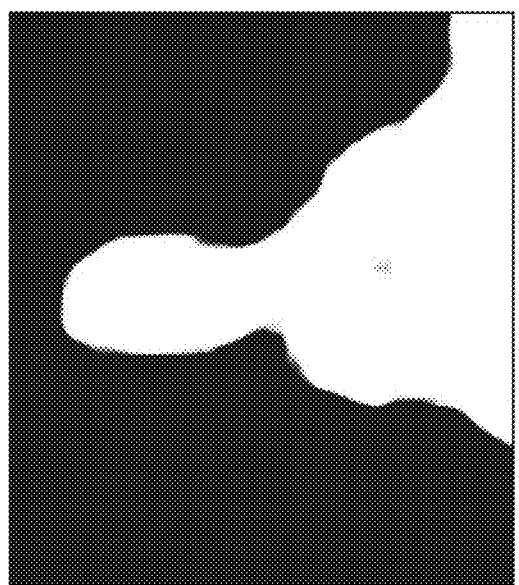
Figure 5B:
Figure 3C:
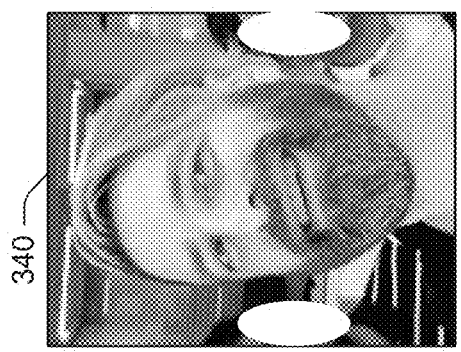
Figure 3C:
Figure 3C:
Figure 3C:
Figure 3C:
Figure 3C:
Figure 3D:

FIGS. 3A, 3B, 3C, and 3D illustrate an example of generating and propagating personal masking edits. FIG. 3A illustrates a representation 300 of detecting faces depicted in a digital image. FIG. 3B illustrates a representation 302 of extracting a person depicted in the digital image using a segment mask for the person. FIG. 3C illustrates a representation 304 of different segment masks for selecting different particular portions of the person depicted in the digital image. FIG. 3D illustrates a representation 306 of input images depicting the person and output images modified using personal masking edits associated with an identifier of the person.

With reference to FIGS. 2 and 3A, the face module 202 receives the image data 114 as describing a digital image 308. For instance, the digital image 308 depicts the person 120 and eight other people who are posing as a group for a photograph. The face module 202 processes the image data 114 to detect faces of persons depicted in the digital image 308.

To do so in one example, the face module 202 leverages a machine learning model trained on training data to detect distinct faces depicted in digital images and to classify the distinct faces as unique persons. For example, the face module 202 assigns a unique identifier to each identified unique person and also assigns a unique identifier to each instance of the unique person's face as depicted in digital images of a set of digital images. In this manner, the face module 202 establishes a one-to-many relationship between an identifier of a particular person and identifiers of instances in which the particular person's face is depicted in the digital images of the set of digital images.

In addition to detecting the faces of persons depicted in the digital image 308, the face module 202 detects objects depicted in the digital image 308 and classifies detected objects as person objects or detected persons. For example, the face module 202 leverages a machine learning model such as a convolutional neural network trained on training data to detect person objects depicted in digital images and to segment detected person objects within the digital images. In one example the face module 202 leverages a convolutional neural network such as EfficientNet-BO as a backbone network to detect person objects depicted in digital images and to segment detected person objects within the digital images.

For example, by detecting faces of persons depicted in the digital image 308 and by detecting person objects depicted in the digital image 308, the face module 202 is capable of generating a processed digital image 310. As shown, the processed digital image 310 depicts a bounding box 312 for a face of the person 120 as well as detected person objects 314-326 which each correspond to one of the eight other people who are posing as the group depicted in the digital image 308. In the illustrated example, the face module 202 generates the face data 210 as describing the processed digital image 310.

As shown in FIG. 2, the person module 204 receives the face data 210 and the person data 112, and the person module 204 processes the face data 210 and/or the person data 112 to generate association data 212. For instance, the person module 204 is illustrated as having, receiving, and/or transmitting the person data 112 which describes associations between identifiers of persons depicted in digital images of the set of digital images and corresponding identifiers of faces of the persons depicted in the digital images. In an example, the person data 112 is included in a database that associates the digital images of the set of digital images with identifiers of persons depicted in the digital images. The person module 204 processes the face data 210 to identify a face identifier and a person identifier for each of the detected person objects 314-326, and then updates the person data 112 to include associations between the person identifiers and the corresponding face identifiers of the detected person objects 314-326.

In some examples, the person module 204 updates the person data 112 to include additional information such as information specified by a user interacting with an input device (e.g., a microphone, a stylus, a mouse, a keyboard, a touchscreen, etc.) relative to the user interface 124 which is displaying the digital image 308. In one example, the user interacts with the input device to generate the edit data 116 as describing a name of the person 120. In this example, the face module 202 receives and processes the edit data 116 to generate the face data 210 as describing the name of the person 120 and the person module 204 receives and processes the face data 210 to update the person data 112 by associating the name of the person 120 with an identifier of the person 120.

For example, the person data 112 also describes personal or person-specific masking edits corresponding to each of the identifiers of the persons described by the person data 112. In one example, the personal masking edits are represented as extensible metadata platform documents. In some examples, the personal masking edits are represented in other formats and/or using different types of documents. For instance, the personal masking edits are usable to automatically propagate editing operations to the digital image 308 and other digital images included in the set of digital images.

Consider an example in which the person data 112 describes a particular personal masking edit that is associated with an identifier that uniquely identifies a person detected as the person object 316 in the processed digital image 310. As shown in the digital image 308, the person detected as the person object 316 is wearing a multi-colored plaid shirt. For instance, the particular masking edit describes a clothes machine learning based mask or a clothes mask and a single solid color. In this example, the particular masking edit is usable to automatically modify the multi-colored plaid shirt such that the shirt depicts the single solid color in the digital image 308.

Consider another example in which the person data 112 does not describe the particular personal masking edit. In this example, the user interacts with the input device relative to the user interface 124 to generate the edit data 116 as describing the clothes machine learning based mask and the single solid color. The face module 202 receives and processes the edit data 116 to generate the face data 210 as describing the single solid color applied to the shirt worn by the person detected as the person object 316. The person module 204 receives and processes the face data 210 to update the person data 112 to include the particular personal masking edit which is now usable in examples such as the previous example.

As part of processing the face data 210, the person module 204 generates a segment mask 328 for the person 120 (e.g., an object identified as the person 120). As illustrated in FIG. 3B, the person module 204 computes an overlap score for the person 120 and also for each of the detected person objects 314-326. For example, the person module 204 computes the overlap score for the person 120 based on an area of overlap between the bounding box 312 for the face of the person 120 and the segment mask 328 for the person 120 as illustrated in a digital image 330.

In another example, the person module 204 computes the overlap score for the person 120 based on a number of pixels of the face of the person 120 that are overlapping a full person mask 332 for the person 120 and a total number of pixels of the face of the person 120. In this example, the person module 204 computes an overlap score for each of the detected person objects 314-326 based on a number of pixels of the face of the person 120 that are overlapping a full person mask for each of the detected person objects 314-326 and the total number of pixels of the face of the person 120. In one example, this is representable as:

$$\text{overlap score} = \frac{\text{number of face pixels overlapping with mask region}}{\text{total number of face pixels}}$$

In an example, a person object having a highest overlap score is determined to be the person object corresponding to the bounding box 312 of the face of the person 120. For example, the person module 204 determines that the person 120 has a higher overlap score than each of the detected person objects 314-326. Based on this determination, the person module 204 uses the segment mask 328 to segment the person 120 from the digital image 330 by generating an extracted segment mask image 334. For example, the extracted segment mask image 334 is a separate digital image from the digital image 308.

The person module 204 generates the association data 212 as describing the extracted segment mask image 334 in one example. For instance, the person module 204 updates the person data 112 to indicate that an identifier for the person 120 corresponds to the bounding box 312 for the face of the person 120. The interface module 206 receives the association data 212, the edit data 116, and the person data 112, and the interface module 206 processes the association data 212, the edit data 116, and/or the person data 112 to generate modified image data 214.

In an example workflow, the interface module 206 processes the association data 212 to identify types of machine learning based masks of the application for editing digital content that are usable to select a particular portion of the person 120 based on the extracted segment mask image 334. When selected using a machine learning based mask, the particular portion of the person 120 is editable locally, e.g., without modifying a remaining portion of the digital image 308. For example, the interface module 206 identifies a facial mask, a facial skin mask, a teeth mask, a clothes mask, a hair mask, and a beard mask as the types of machine learning based masks of the application for editing digital content that are usable to select various particular portions of the person 120.

In this example, indications of the identified types of machine learning based masks are displayed in a user interface 124 of the application as illustrated in the representation 304 illustrated in FIG. 3C. As shown, the representation 304 includes an indication 336 of the facial mask, an indication 338 of the facial skin mask, an indication 340 of the teeth mask, an indication 342 of the clothes mask, an indication 344 of the hair mask, and an indication 346 of the beard mask. Although the particular masks corresponding to the indications 336-346 are usable to segment or select the various particular portions of the person 120, it is to be appreciated that the mask module 110 is not limited to the particular masks. For instance, in other examples, the mask module 110 is capable of generating and/or implementing eye masks, ear masks, eyebrow masks, mustache masks, accessory masks, handbag masks, jewelry masks, hat masks, glove masks, shoe masks, and so forth.

For example, the user interacts with the input device relative to the user interface 124 of the application for editing digital content to select one of the types of machine learning based masks for editing the person 120 depicted in the digital image 308 by selecting a corresponding one of the indications 336-346. In this example, the user interacts with the input device to generate the edit data 116 as describing a selection of the indication 344 of the hair mask and the color green. The interface module 206 receives and processes the edit data 116 and the association data 212 to generate the modified image data 214 as describing the hair mask and the color green.

In one example, the interface module 206 generates the modified image data 214 as describing a modification to input images 348-352 that are included in the representation 306 of FIG. 3D. As shown, each of the input images 348-352 depicts the person 120 having hair that is colored pink. For instance, the display module 208 receives and processes the modified image data 214 to display output images 354-358 in the user interface 124.

For example, output image 354 is generated by editing input image 348 to change the person's 120 hair color from pink to green; output image 356 is generated by editing input image 350 to change the person's 120 hair color from pink to green; and output image 358 is generated by editing input image 352 to change the person's 120 hair color from pink to green. Because the input images 348-352 are edited using the hair mask in one example, the color green is only applied to the person's 120 hair in the output images 354-358. As shown, all portions of the output images 354, 365, 358 other than the person's 120 hair are identical to corresponding portions of the input images 348, 350, 352, respectively. For example, the output digital images 354-358 are generated automatically and without user intervention.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 4:
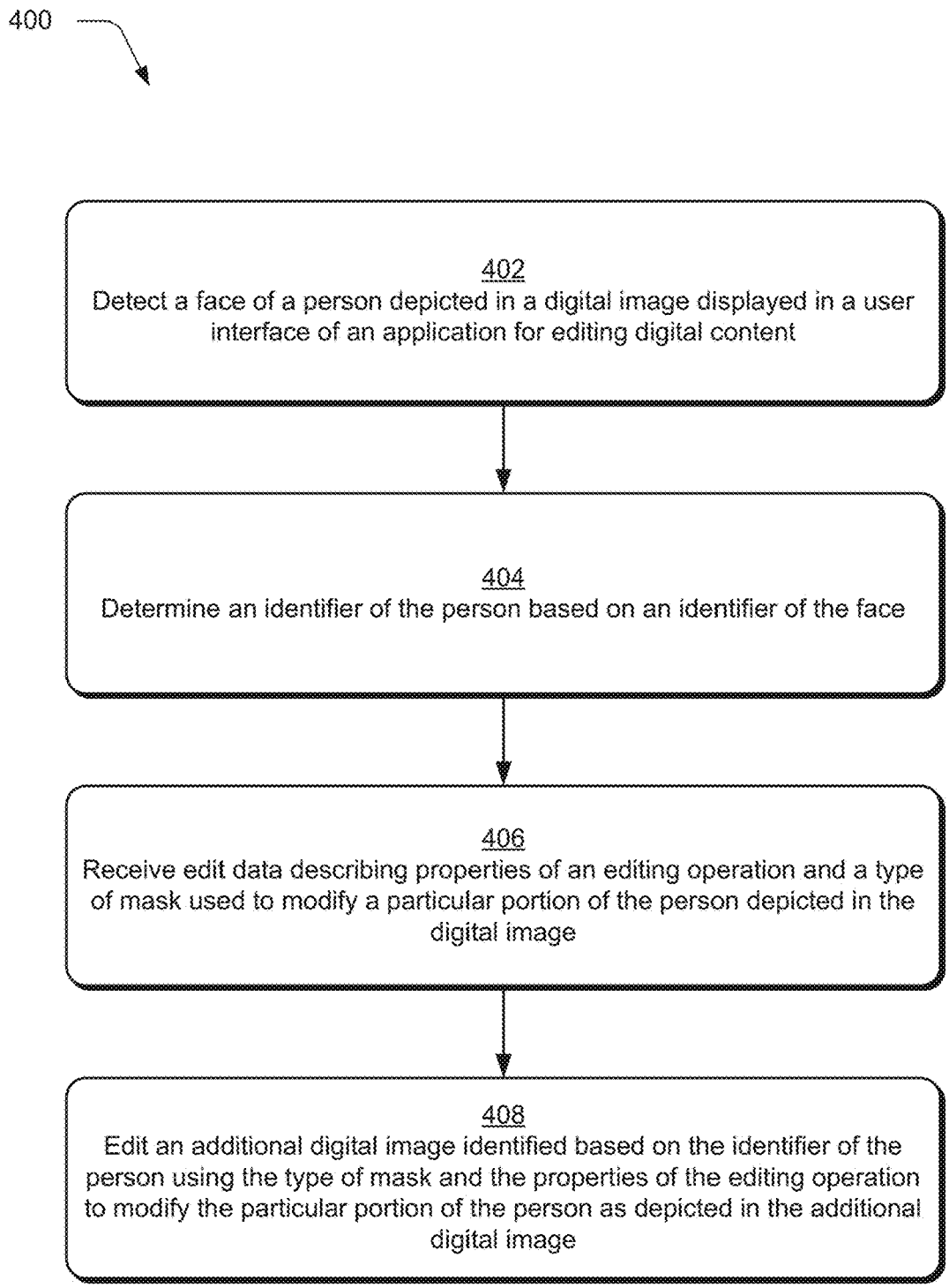
FIG. 4 is a flow diagram depicting a procedure in an example implementation in which edit data is received describing properties of an editing operation used to modify a particular portion of a person depicted in a digital image and an additional digital image is edited using the properties of the editing operation to modify the particular portion of the person as depicted in the additional digital image.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-3D. FIG. 4 is a flow diagram depicting a procedure 400 in an example implementation in which edit data is received describing properties of an editing operation used to modify a particular portion of a person depicted in a digital image and an additional digital image is edited using the properties of the editing operation to modify the particular portion of the person as depicted in the additional digital image.

A face of a person depicted in a digital image displayed in a user interface of an application for editing digital content is detected (block 402). For example, the computing device 102 implements the mask module 110 to detect the face of the person depicted in the digital image. An identifier of the person is determine based on an identifier of the face (block 404). In an example, the mask module 110 determines the identifier of person.

Edit data describing properties of an editing operation and a type of mask used to modify a particular portion of the person depicted in the digital image is received (block 406). In one example, the computing device 102 implements the mask module 110 to receive the edit data. An additional digital image identified based on the identifier of the person is edited using the type of mask and the properties of the editing operation to modify the particular portion of the person as depicted in the additional digital image (block 408). For example, the mask module 110 edits the additional digital image using the type of mask and the properties of the editing operation.

Figure 5:
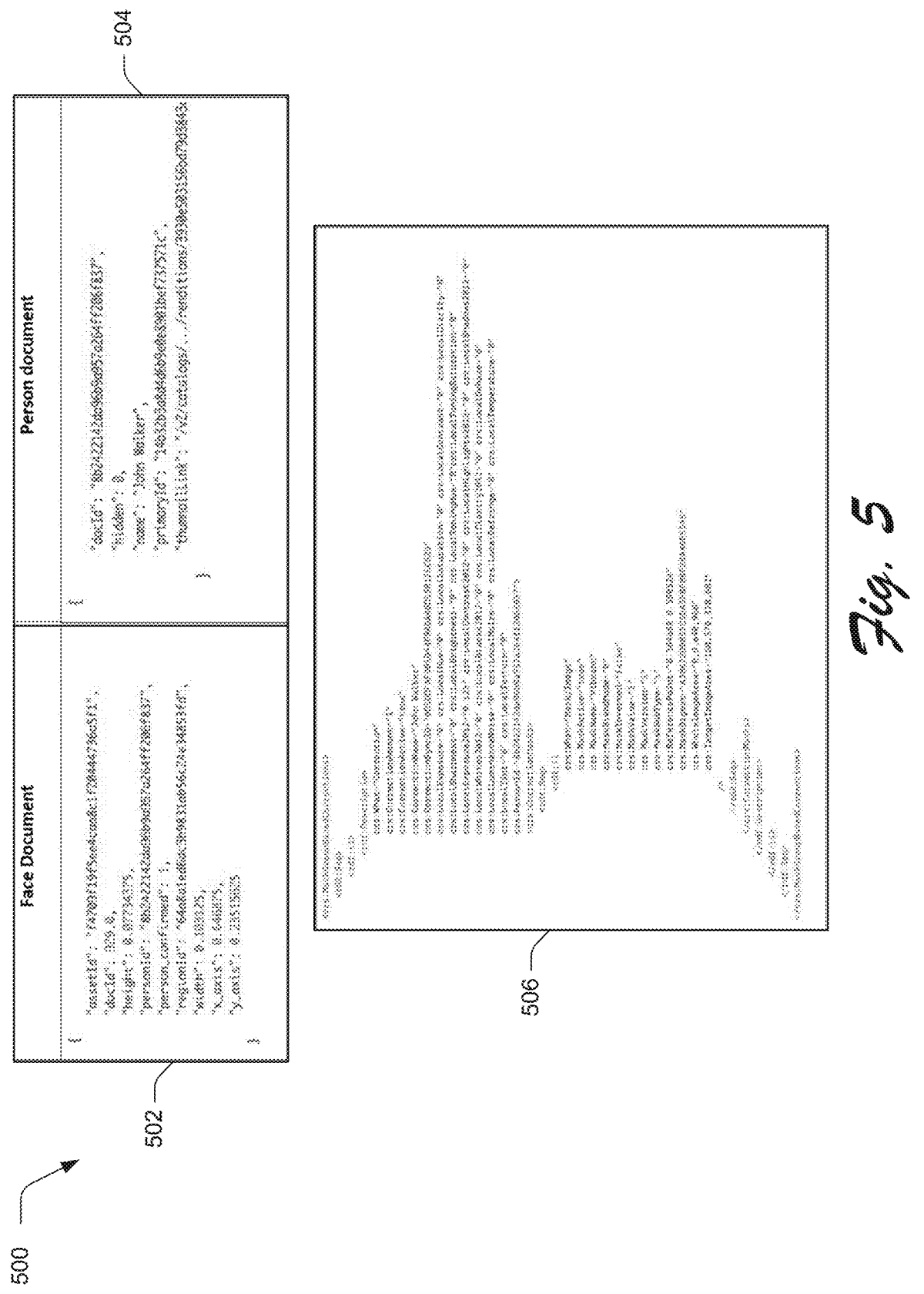

FIG. 5 illustrates a representation 500 of example extensible metadata platform documents. The representation 500 includes an extensible metadata platform document 502 for representing an identifier of a face of a person depicted in a digital image of a set of digital images; an extensible metadata platform document 504 for representing an identifier of a person depicted in a digital image or in multiple digital images of the set of digital images; and an extensible metadata platform document 506 for representing a personal masking edit that is usable to modify a portion of a person depicted in a digital image or in multiple digital images of the set of digital images. For example, the person data 112 describes the extensible metadata platform documents 502-506.

Consider an example in which an identifier of a person "8b2422142da96b9a957a264ff206f837" included in the extensible metadata platform document 506 corresponds to a mask group for the person. In this example, the mask module 110 leverages information available in the person data 112 to generate the mask group for the person using a personalized name of the person described by the person data 112. For example, the identifier of the person "8b2422142da96b9a957a264ff206f837" uniquely identifies the person 120 and the user interacts with the input device relative to the user interface 124 to specify a personalized name of the person 120 as "John Walker." In the illustrated example, the extensible metadata platform document 506 includes the personalized name in a "CorrectionName" field.

In response to the user interacting with the input device to select the indication 344 of the hair mask, the mask module 110 includes the hair mask in a mask group named "John's Hair" or generates a new mask group named "John's Hair" and includes the hair mask in the new mask group. The mask module 110 uses the mask group "John's Hair" to organize personal masking edits that use the hair mask to segment and modify the person's 120 hair in digital images of the set of digital images. For example, the mask group "John's Hair" includes a personal masking edit that colors the person's 120 hair green, a personal masking edit that colors the person's 120 hair pink, and so forth.

Figure 6:
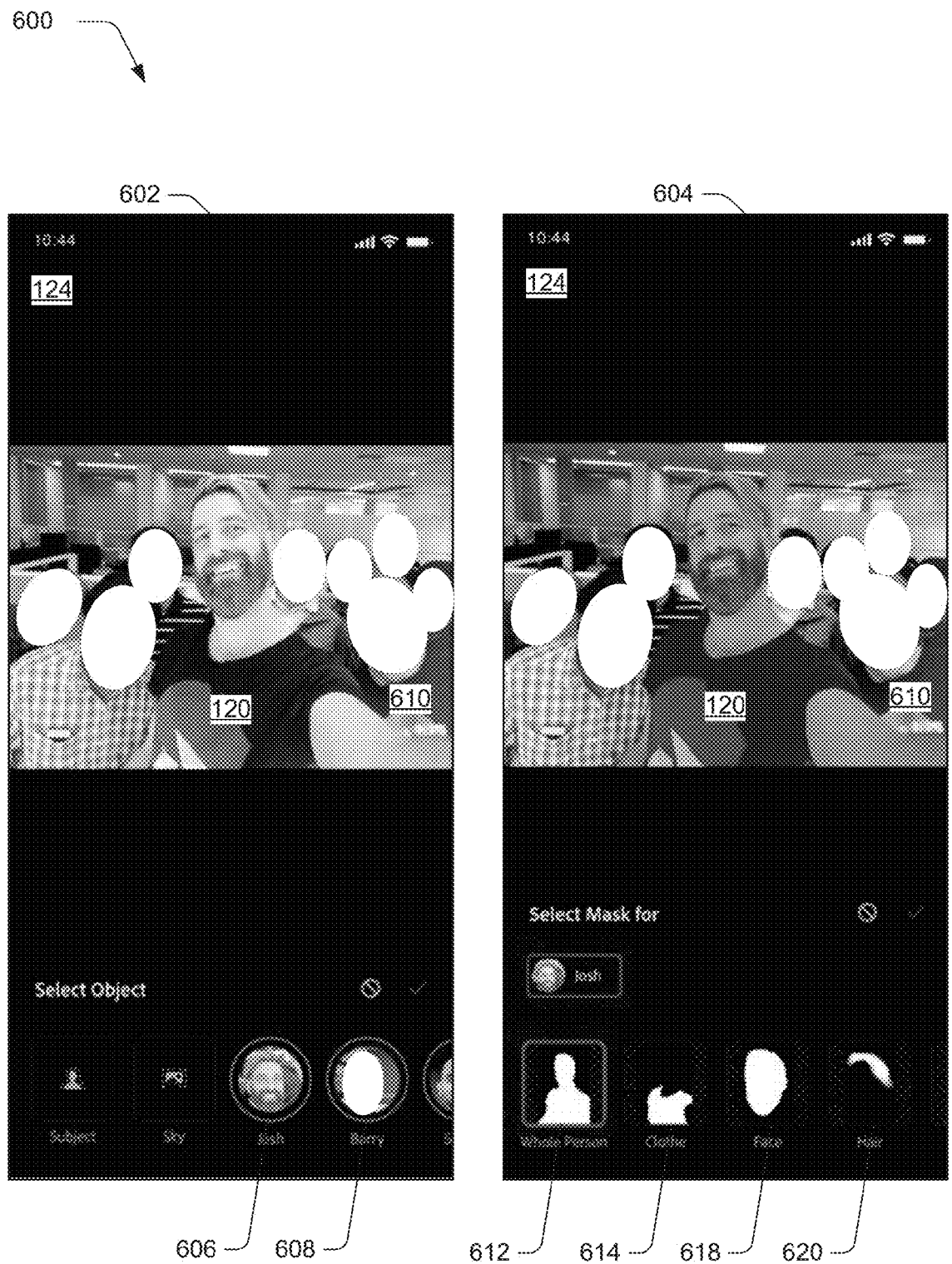
FIG. 6 illustrates a representation of an example user interface for generating and propagating personal masking edits.

FIG. 6 illustrates a representation 600 of an example user interface for generating and propagating personal masking edits. The representation 600 includes a first example 602 of the user interface 124 and a second example 604 of the user interface 124. In the first example 602, a digital image depicting the person 120 is displayed in the user interface 124 in addition to user interface elements 606, 608. For example, user interface element 606 is usable to segment or select the person 120 in the digital image and user interface element 608 is usable to segment or select a different person 610 that is also depicted in the digital image displayed in the user interface 124.

For example, a user interacts with an input device (e.g., a microphone, a finger/touchscreen, a stylus, a mouse, etc.) relative to the user interface 124 to select the user interface element 606. In this example, the mask module 110 receives the edit data 116 describing the selection of the user interface element 606 and the mask module 110 processes the edit data 116 to segment or select the person 120 as shown in the second example 604. For instance, in the second example 604 the user interface 124 displays user interface elements 612-620 which are selectable to segment or select different portions of the person 120 depicted in the digital image.

In some examples, user interface element 612 is usable to apply a whole person mask to the digital image to select/segment an entirety of the person 120; user interface element 614 is usable to apply a clothes mask to the digital image to select/segment a shirt of the person 120; user interface element 618 is usable to apply a facial mask to the digital image to select/segment a face of the person 120; and user interface element 620 is usable to apply a hair mask to the digital image to select/segment the person's 120 hair. The user interacts with the input device relative to the user interface 124 to select one of the user interface elements 612-620 to segment or select a portion of the person 120, and the user further interacts with the input device relative to the user interface 124 to modify a visual appearance of the selected portion of the person 120. For example, the mask module 110 receives the edit data 116 describing properties of an editing operation performed to modify the visual appearance of the selected portion of the person 120, and the mask module 110 generates a personal masking edit for the person 120 that is usable to select and edit the portion of the person 120 as depicted in additional digital images.

Figure 7:
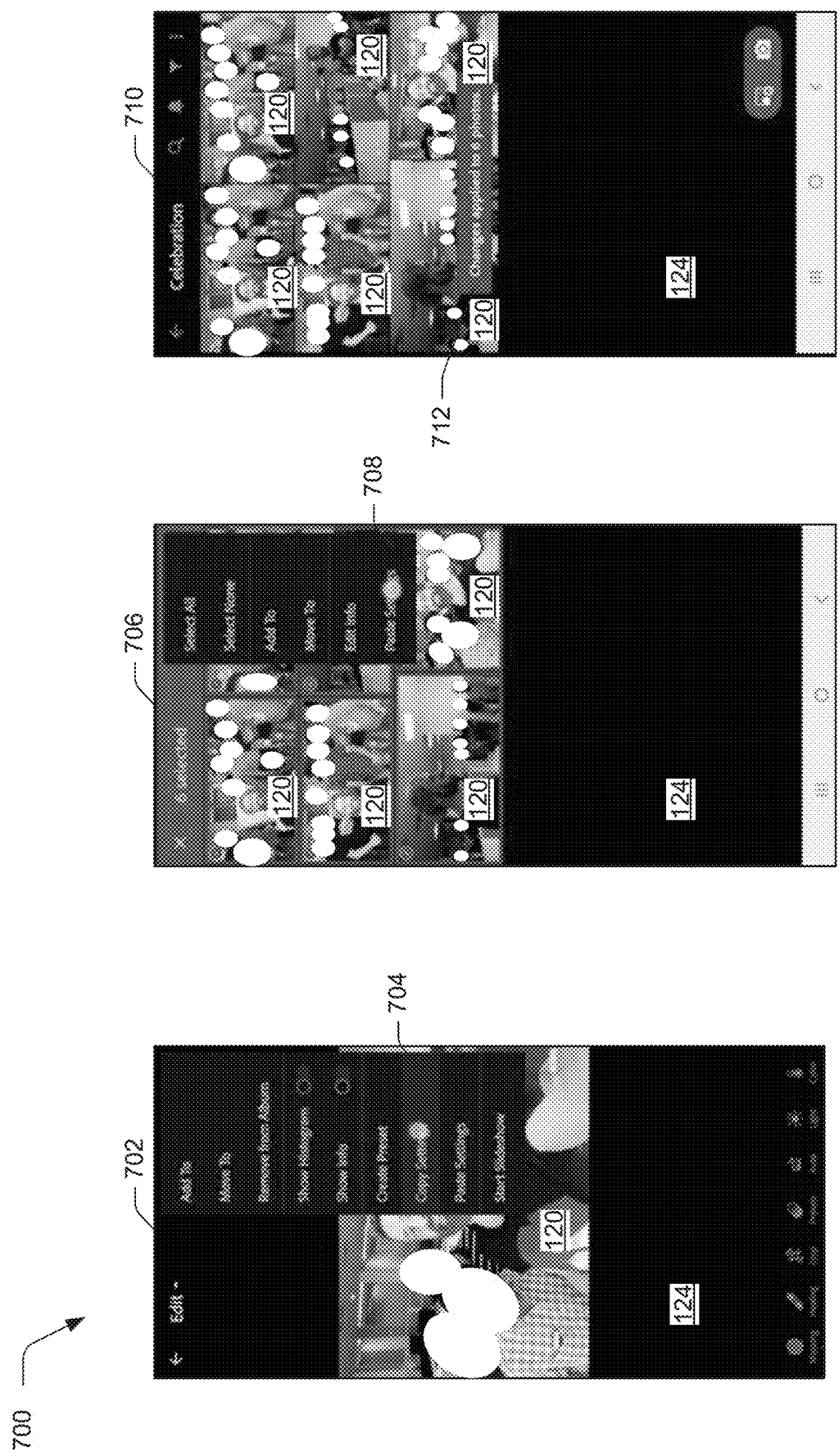
FIG. 7 illustrates a representation of an example user interface for propagating edits applied to a person depicted in a digital image to additional digital images that depict the person.

FIG. 7 illustrates a representation 700 of an example user interface for propagating edits applied to a person depicted in a digital image to additional digital images that depict the person. In a first example 702, the user interacts with the input device relative to the user interface 124 to modify portions of the person 120 in a digital image displayed in the user interface 124. For example, the user interacts with the input device to segment or select a beard of the person 120 using a beard mask. After segmenting or selecting the beard of the person 120 using the beard mask, the user interacts with the input device relative to the user interface 124 to color the beard of the person 120 green. In an example, the mask module 110 generates a first personal masking edit for the person 120 that is usable to color the person's 120 beard green in additional digital images that depict the person 120. In this example, the mask module 110 updates the person data 112 to include the first personal masking edit for the person 120 as being associated with an identifier for the person 120.

Continuing the first example 702, the user interacts with the input device relative to the user interface 124 to segment or select hair of the person 120 using a hair mask. After segmenting or selecting the hair of the person 120 using the hair mask, the user interacts with the input device relative to the user interface 124 to color the hair of the person 120 blue. In one example, the mask module 110 generates a second personal masking edit for the person 120 that is usable to color the person's 120 hair blue in additional digital images that depict the person 120. In this example, the mask module 110 updates the person data 120 to include the second personal masking edit for the person 120 as being associated with the identifier for the person 120.

For instance, after coloring the person's 120 beard green and the person's 120 hair blue, the user interacts with the input device relative to the user interface 124 to select a user interface element 704. The mask module 110 receives the edit data 116 describing the selection of the user interface element 704, and the mask module 110 processes the person data 112 to load the first personal masking edit for the person 120 and the second personal masking edit for the person 120 into a memory or a register for applying the color green to the beard and the color blue to the hair of the person 120 in additional digital images that depict the person 120.

In a second example 706, the user interacts with the input device relative to the user interface 124 to specify five additional digital images that depict the person 120 to be modified using the first personal masking edit and the second personal masking edit described by the person data 112 and/or by the memory or the register. In an example, the mask module 110 leverages the identifier for the person 120 described by the person data 112 to identify a set of digital images that depict the person 120. In this example, the user interacts with the input device relative to the user interface 124 to specify a subset (e.g., the five additional digital images) of the set of digital images that depict the person 120 to be modified.

The user then interacts with the input device relative to the user interface 124 to select a user interface element 708. For example, the mask module 110 receives the edit data 116 describing the selection of the user interface element 708, and the mask module 110 processes the edit data 116, the person data 112, and/or data in the memory or the register to edit each of the five additional digital images such that each of the five edited digital images depicts the beard of the person 120 colored green and the hair of the person 120 colored blue. To do so in one example, the mask module 110 uses the beard mask to first select the beard of the person 120 in each of the five additional digital images and then colors the beard of the person 120 green in each of the five additional digital images. Similarly, the mask module 110 uses the hair mask to first select the hair of the person 120 in each of the five additional digital images and then colors the hair of the person 120 blue in each of the five additional digital images.

In one example, the mask module 110 edits the five additional digital images automatically and without additional intervention by the user upon receiving the edit data 116 describing the selection of the user interface element 708. In other examples, the mask module 110 is capable of generating edited versions of the five additional digital images depicting the person 120 having a green colored beard and blue colored hair as thumbnail images or full resolution images for display in the user interface 124, and the user interacts with the input device relative to the user interface 124 to accept the edits applied to each of the five additional digital images. In a third example 710, the edited digital images are displayed in the user interface 124. As shown, each of the five additional digital images depicts the person 120 with the person's 120 beard colored green and with the person's 120 hair colored blue. A user interface element 712 indicates "Changes applied to 6 photos" which includes the digital image of the first example 702 that the user edited to color the person's 120 beard green and hair blue as well as the five additional digital images that are edited automatically using the beard mask and the hair mask (and properties of editing operations).

Example System and Device

Figure 8:
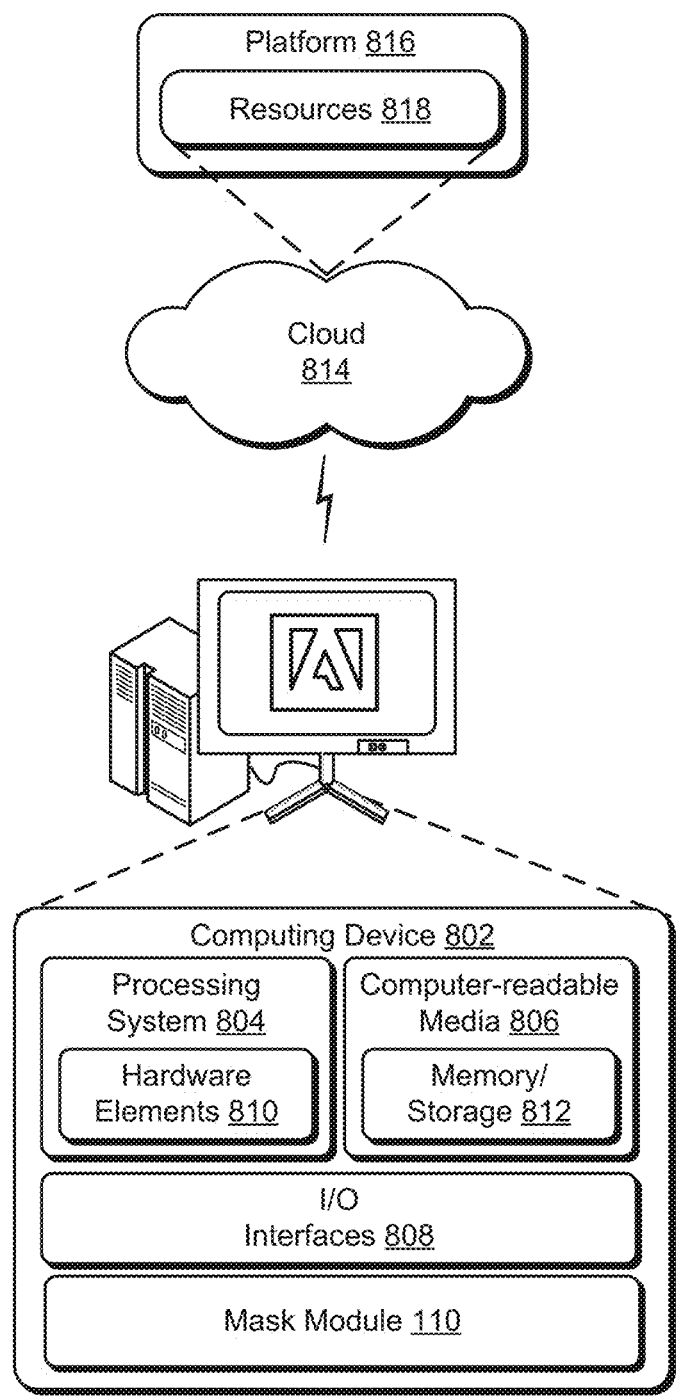
FIG. 8 illustrates an example system that includes an example computing device that is representative of one or more computing systems and/or devices for implementing the various techniques described herein.

FIG. 8 illustrates an example system 800 that includes an example computing device that is representative of one or more computing systems and/or devices that are usable to implement the various techniques described herein. This is illustrated through inclusion of the mask module 110. The computing device 802 includes, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that are configured as processors, functional blocks, and so forth. This includes example implementations in hardware as an application specific integrated circuit or other logic device formed using one or more semiconductors. The hardware elements 810 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 806 is illustrated as including memory/storage 812. The memory/storage 812 represents memory/storage capacity associated with one or more computer-readable media. In one example, the memory/storage 812 includes volatile media (such as random access memory (RAM)) and/or nonvolatile media (such as read only memory (ROM), Flash memory, optical disks, magnetic disks, and so forth). In another example, the memory/storage 812 includes fixed media (e.g., RAM, ROM, a fixed hard drive, and so on) as well as removable media (e.g., Flash memory, a removable hard drive, an optical disc, and so forth). The computer-readable media 806 is configurable in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 802. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 802, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 810. For example, the computing device 802 is configured to implement particular instructions and/or functions corresponding to the software and/or hardware modules. Accordingly, implementation of a module that is executable by the computing device 802 as software is achieved at least partially in hardware, e.g., through use of computer-readable storage media and/or hardware elements 810 of the processing system 804. The instructions and/or functions are executable/operable by one or more articles of manufacture (for example, one or more computing devices 802 and/or processing systems 804) to implement techniques, modules, and examples described herein.

The techniques described herein are supportable by various configurations of the computing device 802 and are not limited to the specific examples of the techniques described herein. This functionality is also implementable entirely or partially through use of a distributed system, such as over a "cloud" 814 as described below.

The cloud 814 includes and/or is representative of a platform 816 for resources 818. The platform 816 abstracts underlying functionality of hardware (e.g., servers) and software resources of the cloud 814. For example, the resources 818 include applications and/or data that are utilized while computer processing is executed on servers that are remote from the computing device 802. In some examples, the resources 818 also include services provided over the Internet and/or through a subscriber network, such as a cellular or Wi-Fi network.

The platform 816 abstracts the resources 818 and functions to connect the computing device 802 with other computing devices. In some examples, the platform 816 also serves to abstract scaling of resources to provide a corresponding level of scale to encountered demand for the resources that are implemented via the platform. Accordingly, in an interconnected device embodiment, implementation of functionality described herein is distributable throughout the system 800. For example, the functionality is implementable in part on the computing device 802 as well as via the platform 816 that abstracts the functionality of the cloud 814.

CONCLUSION

Although implementations of systems for generating and propagating personal masking edits have been described in language specific to structural features and/or methods, it is to be understood that the appended claims are not necessarily limited to the specific features or methods described. Rather, the specific features and methods are disclosed as example implementations of systems for generating and propagating personal masking edits, and other equivalent features and methods are intended to be within the scope of the appended claims. Further, various different examples are described and it is to be appreciated that each described example is implementable independently or in connection with one or more other described examples.

What is claimed is:

1. A method comprising:
   receiving an input, by a computing device via a user interface, involving a personal masking edit to a person depicted in a digital image;
   storing, by the computing device, a preset that includes edit data describing the personal masking edit and an identifier of the person;
   detecting, by the computing device, one or more identifiers associated with additional digital image, the one or more identifiers corresponding to one or more persons, respectively, included in the additional digital image;
   determining, by the computing device, at least one said identifier associated with the additional digital image corresponds to the identifier of the person in the preset;
   propagating, by the computing device, automatically and without user intervention, the personal masking edit from the edit data of the preset to the additional digital image by:
      generating a segment based on the person included in the additional digital image; and
      editing the additional digital image using the segment mask and the edit data of the preset detected using the identifier.

2. The method as described in claim 1, further comprising generating a segment mask for the person depicted in the digital image using a machine learning model, the segment mask usable to determine the identifier of the person.

3. The method as described in claim 1, wherein the identifier of the person is determined based on an area of overlap between a bounding box for a face of the person and a segment mask for the person.

4. The method as described in claim 1, further comprising generating an indication of a type of mask and an indication of a different type of mask.

5. The method as described in claim 4, wherein the different type of mask is usable to modify a different particular portion of the person depicted in the digital image.

6. The method as described in claim 4, wherein the indication of the different type of mask is generated by extracting the person from the digital image as a separate digital image using a segment mask for the person and identifying the different type of mask based on the separate digital image.

7. The method as described in claim 1, wherein the digital image is edited automatically and without user intervention.

8. The method as described in claim 1, wherein the edit data is stored as a preset that is usable to modify a particular portion of the person as depicted in the additional digital image based on the personal masking edit.

9. The method as described in claim 1, wherein the edit data is detected from a database that associates the identifier with the person.

10. A method comprising:
   receiving, by a computing device, an input via a user interface involving a personal masking edit to a person depicted in a digital image;
   storing, by the computing device, edit data describing the personal masking edit and an identifier of the person as a preset;
   detecting, by the computing device, an additional digital image;
   determining, by the computing device, one or more identifiers associated with an additional digital image, the one or more identifiers corresponding to one or more persons, respectively, included in the additional digital image;

determining, by the computing device, at least one said identifier associated with the additional digital image corresponds to the identifier of the person in the preset;

responsive to the determining, generating a segment mask by the computing device based on the person included in the additional digital image;

propagating, by the computing device, the personal masking edit to the segment mask of the person depicted in the additional digital image, automatically and without user intervention, using the edit data corresponding to the preset; and outputting, by the computing device, the edited additional digital image for display in the user interface.

11. The method as described in claim 10, further comprising generating the segment mask for the person depicted in the digital image using a machine learning model.

12. The method as described in claim 10, wherein the identifier of the person is determined based on an area of bounding box overlap.

13. The method as described in claim 12, wherein the generating the segment mask further comprises generating an indication of a type of mask and an indication of a different type of mask.

14. The method as described in claim 13, wherein the different type of mask is usable to modify a different particular portion of the person depicted in the additional digital image.

15. One or more computer-readable storage media storing instructions that, responsive to execution by a processing device, causes the processing device to perform operations comprising:

receiving an input via a user interface involving a personal masking edit to a person depicted in a digital image;

storing edit data describing the personal masking edit and an identifier of the person as a preset;

detecting an additional digital image;

determining one or more identifiers associated with an additional digital image, the one or more identifiers corresponding to one or more persons, respectively, included in the additional digital image;

determining at least one said identifier associated with the additional digital image corresponds to the identifier of the person in the preset;

responsive to the determining, generating a segment mask based on the person included in the additional digital image;

propagating the personal masking edit to the segment mask of the person depicted in the additional digital image, automatically and without user intervention, using the edit data corresponding to the preset; and outputting the edited additional digital image for display in the user interface.

16. The one or more computer-readable storage media as described in claim 15, further comprising generating the segment mask for the person depicted in the digital image using a machine learning model.

17. The one or more computer-readable storage media as described in claim 15, wherein the identifier of the person is determined based on an area of bounding box overlap.

18. The one or more computer-readable storage media as described in claim 17, wherein the generating the segment mask further comprises generating an indication of a type of mask and an indication of a different type of mask.

19. The one or more computer-readable storage media as described in claim 18, wherein the different type of mask is usable to modify a different particular portion of the person depicted in the additional digital image.

* * * * *

UNITED STATES PATENT AND TRADEMARK OFFICE
CERTIFICATE OF CORRECTION

PATENT NO.         : 12,243,121 B2
APPLICATION NO.    : 17/890461
DATED              : March 4, 2025
INVENTOR(S)        : Subham Gupta, Arnab Sil and Anuradha Page 1 of 1

It is certified that error appears in the above-identified patent and that said Letters Patent is hereby corrected as shown below:

In the Claims

Column 18, Line 10, after "associated with", insert --an--.

Column 18, Line 20, after "a segment", insert --mask--.

Signed and Sealed this
Twentieth Day of May, 2025

Coke Morgan Stewart
*Acting Director of the United States Patent and Trademark Office*